United States Patent [19]

Pontecorvo

[11] Patent Number: 4,496,187
[45] Date of Patent: Jan. 29, 1985

[54] TRAILER CONSTRUCTION

[76] Inventor: John J. Pontecorvo, 11 McCampbell Rd., Holmdel, N.J. 07733

[21] Appl. No.: 454,169

[22] Filed: Dec. 28, 1982

[51] Int. Cl.³ ............................................. B62D 27/06
[52] U.S. Cl. .................................... 296/182; 296/204
[58] Field of Search ..................... 296/182, 181, 35.1, 296/35.3, 204; 410/68, 69, 71, 72, 73, 75, 78, 79

[56] References Cited

U.S. PATENT DOCUMENTS

| | | | |
|---|---|---|---|
| 3,321,162 | 5/1967 | Connerat | 410/73 |
| 3,439,822 | 4/1969 | Korodi | 296/182 |
| 3,924,544 | 12/1975 | Grall et al. | 410/78 |

*Primary Examiner*—Robert R. Song
*Attorney, Agent, or Firm*—Stefan J. Klauber

[57] ABSTRACT

A trailer construction, which in a first configuration is adapted for transporting a pair of intermodular containers. The trailer comprises a front section having a hitch means for attaching the trailer to a towing vehicle and a longitidinal, generally horizontally aligned upper deck portion. A drop frame section extends rearwardly of the front section, and includes ground engageable support wheels and a longitudinal generally horizontal lower deck portion, wherein the lower deck is a distance below the said upper deck. Pedestal means are mounted on the drop frame section, and are movable between first and second positions. The pedestal means in the first position includes first support means above the lower deck portion, for supporting the rear end of a first said container to maintain the container substantially horizontal when the front end of the container is supported on said upper deck; and the lower deck portion extends rearwardly of said pedestal means, and is of at least sufficient length to carry a second container thereupon, the front end of which is supported at said pedestal means. When the pedestal means is in its said second position, it is substantially flush with the lower deck portion, permitting carrying of a single container which is entirely positioned upon the lower deck.

10 Claims, 9 Drawing Figures

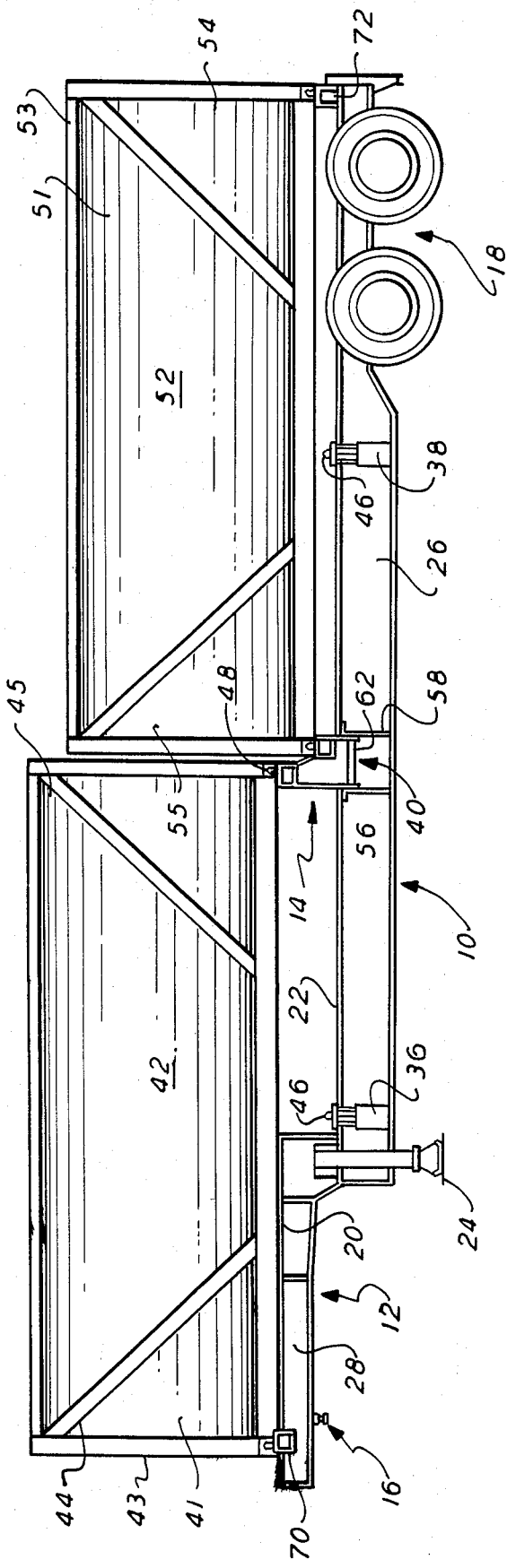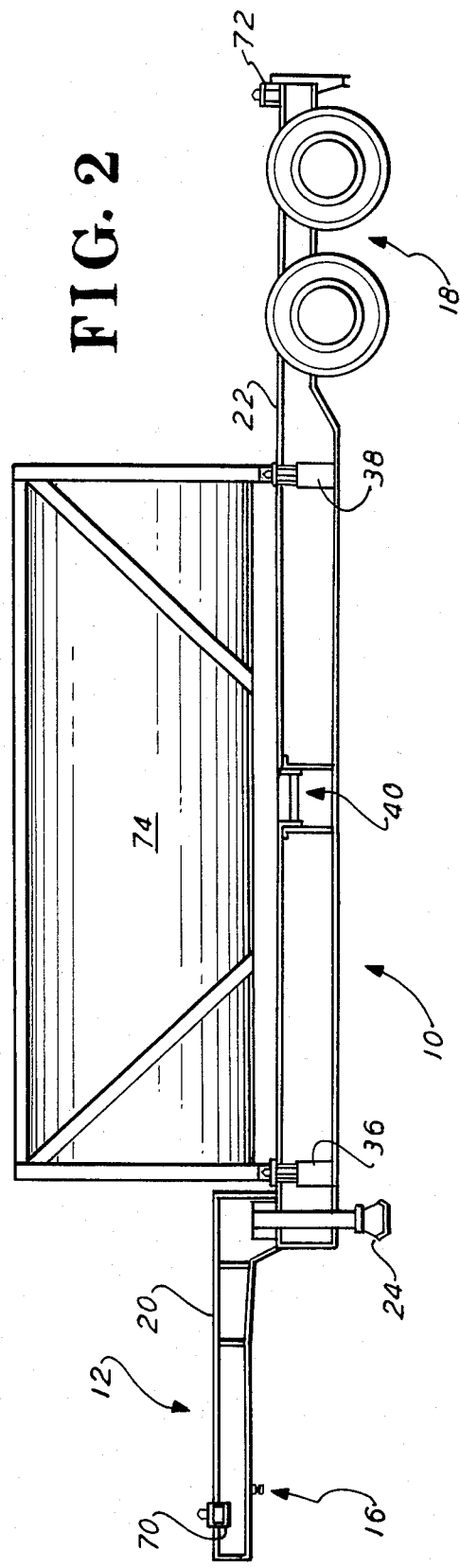

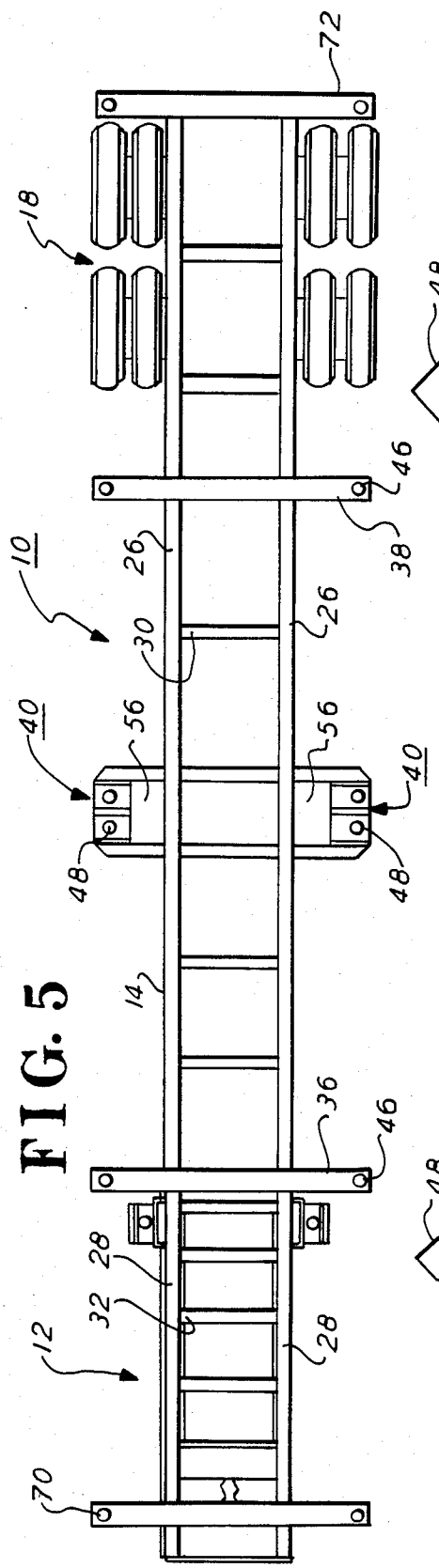
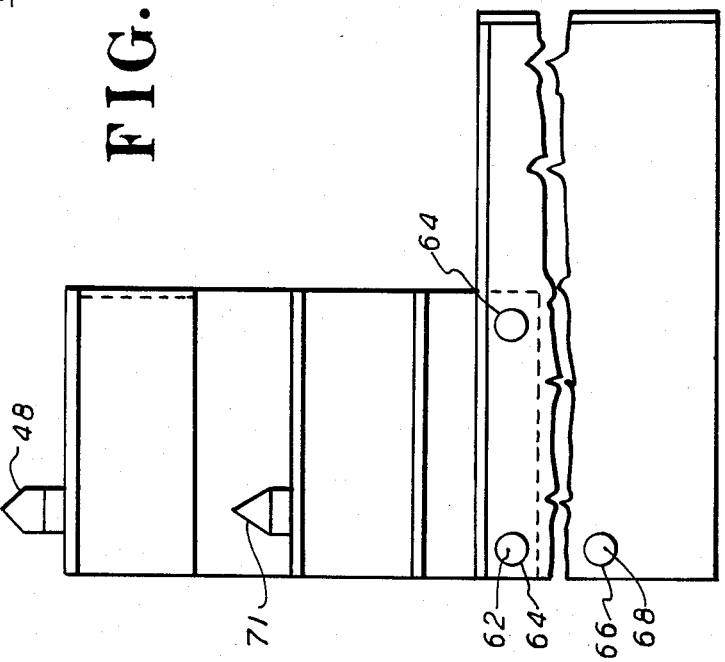

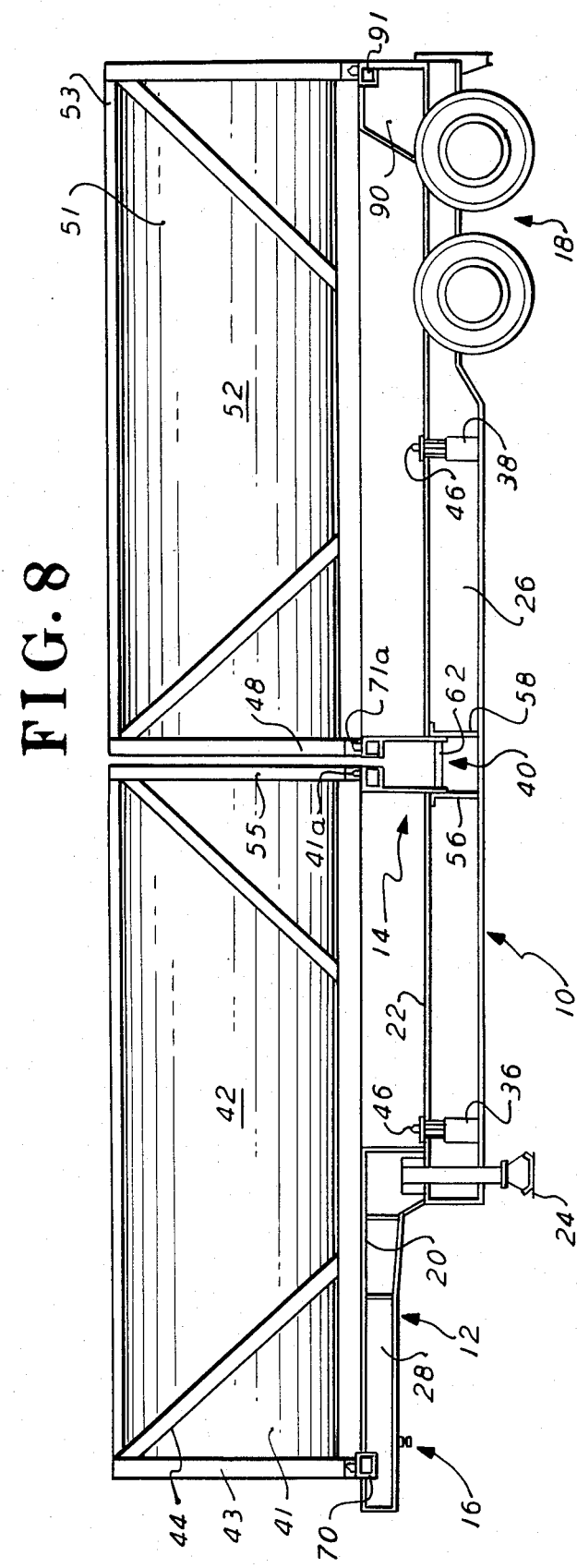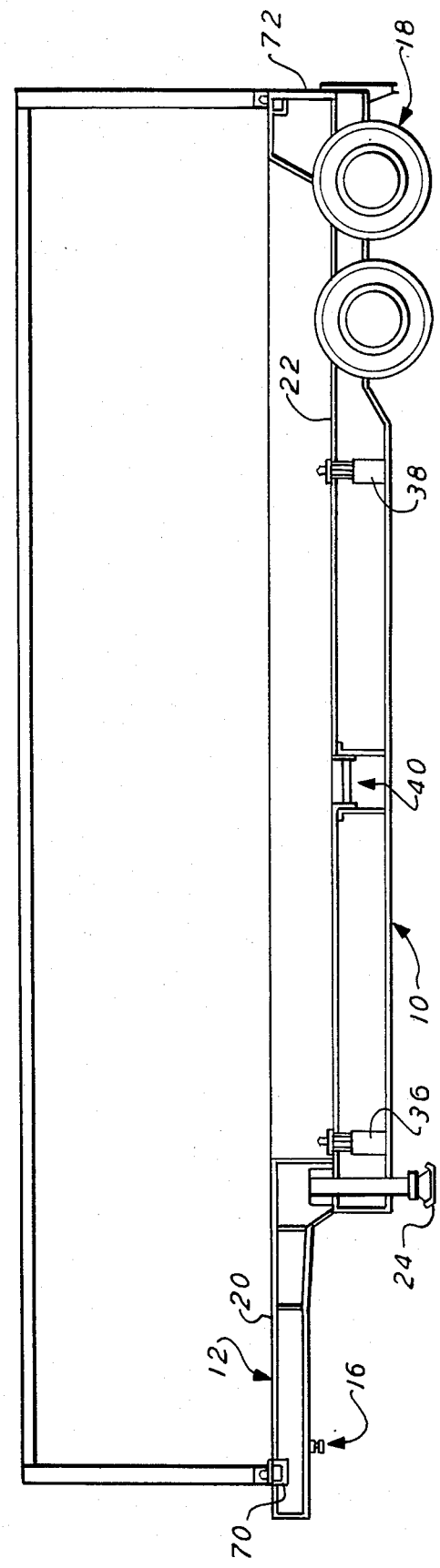

TRAILER CONSTRUCTION

BACKGROUND OF THE INVENTION

1. Field of the Invention

This invention relates generally to trailer construction, and more specifically relates to an improved "drop frame trailer," which can either be configured to carry a single heavily-loaded container, or alternatively, can be configured to carry two unloaded containers.

2. Prior Art

Various forms of vehicle-towed trailers presently being manufactured are referred to as "flats," in that they define a raised upper flat loading surface, while other trailers are termed "drop frame trailers." In "drop frame trailers" the main load-receiving portion between the front and rear ends of the trailer is lowered relative to the front trailer end which overlies the wheel axles of the towing vehicle.

"Flats" are conventionally utilized for carrying various forms of bulk equipment and supplies, whereas drop frame trailers are utilized primarily to carry heavy loads which cannot be readily lifted to the high level of the load carrying surface of flats and require a lower center of gravity.

Still further, with the advent of containerization, marine shipping modules (usually referred to in the industry as "intermodal tank containers") were standardized in predominantly, twenty foot and forty foot lengths. The interface between the container modules and the securement system to the trailer were also standardized—a typical securement system utilizes twist-locks to secure the container at its corners to the trailer. This led to the development of trailers to carry containers of various sizes. The most common types of trailers were short trailers to carry a single twenty foot container, long trailers to carry a single forty foot container, and another type long trailer designed to carry either two twenty foot containers or a single forty foot container.

This concept then allowed the development of tank containers capable of carrying liquids. Due to the density of liquids typically transported, only a twenty foot module container could be used. If this twenty foot container is placed on a twenty foot trailer, the weight exceeds the legal over-the-road weight limitations on the trailer. In order to transport this container, it was thus required to utilize a longer trailer. Due to the heavy weight of such container, it was also highly desirable to utilize a drop-frame trailer to transport such containers.

Such drop frame trailers, in many instances, carry loads in only one direction due to the unavailability of a return load of the same type being available. Furthermore, in many instances, when a drop frame trailer is utilized to carry a load in one direction, the only load which may be available therefore in the return direction, may be the empty container utilized to carry the heavy load. It is therefore wasteful of time, money, and effort to convey only a single empty container for a trailer which is of a size sufficient to carry more than one empty container, but which is unsuitable for carrying such a plurality of containers. Accordingly, a need exists for an improved form of a drop frame trailer, which may be readily converted to carry a plurality of empty containers.

OBJECTS AND SUMMARY OF THE INVENTION

It is thus an object of this invention to provide a drop frame trailer construction capable of securely carrying one heavy loaded intermodular container for delivery, and of carrying two empty such containers on a return trip.

It is a further object of the invention, to provide a drop frame trailer construction which can simply and inexpensively be changed between configurations which enable the aforementioned object.

Now in accordance with the present invention, the foregoing objects, and others as will become apparent in the course of the ensuing specification, are achieved in a trailer construction, which in a first configuration is adapted for transporting a pair of intermodular containers. The trailer comprises a front section having a hitch means for attaching the trailer to a towing vehicle, and a longitudinal generally horizontally aligned upper deck portion. A drop frame section extends rearwardly of the front section, and includes ground engageable support wheels and a longitudinal generally horizontal lower deck portion, wherein the lower deck is a distance below the said upper deck. Pedestal means are mounted on the drop frame section, and are movable between first and second positions. The pedestal means in the first position includes first support means above the lower deck portion for supporting the rear end of a first said container to maintain the container substantially horizontal when the front end of the container is supported on said upper deck; and the lower deck portion extends rearwardly of said pedestal means, and is of at least sufficient length to carry a second container thereupon, the front end of which is supported at said pedestal means. When the pedestal means is in its said second position, it is substantially flush with the lower deck portion, permitting carrying of a single container which is entirely positioned upon the lower deck. Such a trailer construction permits the transporting of a single heavily-loaded container on the lower deck and permits the return of two empty containers supported by the upper deck and pedestal means and lower deck, and by the pedestal means and the lower deck.

In a further embodiment of the invention, an elevated rear bolster is provided, which provided container support at the height of the upper deck. This enables a single forty foot container to be carried on the trailer by being supported at its front on the said upper deck, and at its rear by being supported on the rear bolster. With the pedestal means in its raised (i.e. first) position, a pair of 20-foot containers can be supported by the upper deck, pedestal means, and rear bolster.

BRIEF DESCRIPTION OF THE DRAWINGS

These and other more specific objects and advantages of the invention will become more readily apparent to one skilled in the art from the following detailed description of exemplary embodiments of the invention, taken in conjunction with the accompanying drawings; in which:

FIG. 1 is a side elevational view of the trailer construction of this invention, with the pedestal means positioned to carry two unloaded intermodular containers.

FIG. 2 diagramatically illustrates the trailer construction configured for carrying a single heavily-loaded said container.

FIG. 5 is a top plan view, showing the trailer of FIGS. 1 and 2 without any containers thereon;

FIG. 6 is an end view of the pedestal means, looking from the rearward end of the trailer;

FIG. 7 is a side elevational view of the said pedestal means.

FIG. 8 is a side elevational view of a further embodiment of a trailer construction in accordance with the invention, with the pedestal means positioned to carry two unloaded containers; and FIG. 9 diagramatically illustrates the trailer of FIG. 8 configured for carrying a forty foot container thereon.

DETAILED DESCRIPTION OF THE INVENTION

Figure 3:
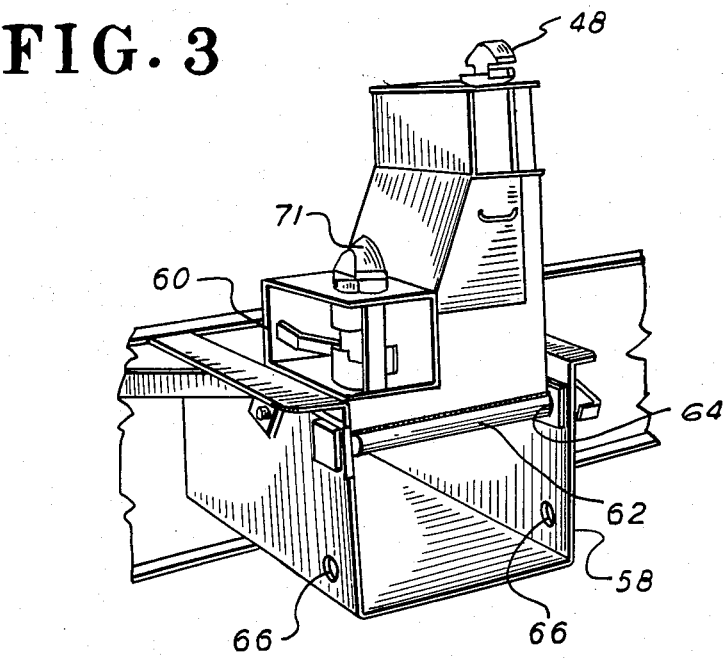
FIG. 3 is a fragmentary perspective view illustrating the pedestal means in the raised position suitable for securing the corner of an unloaded container.
Figure 4:
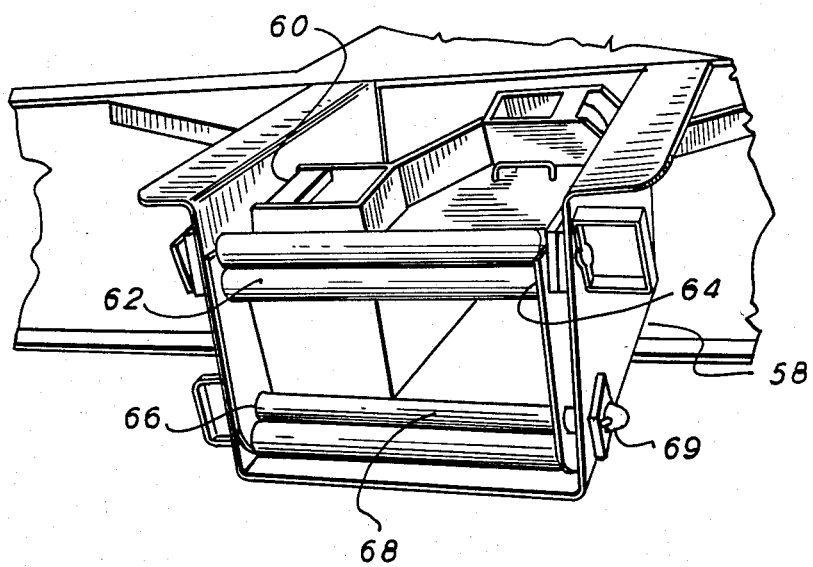
FIG. 4 is a fragmentary perspective view illustrating the pedestal means in its folded, lowered or recessed position.

Referring more specifically to the FIGS. 1, 2, and 5, the reference numeral 10 generally designates the trailer construction of the invention. The trailer construction 10 includes a front section, generally designated 12, and a drop frame or load section generally designated 14. The front section 12 includes a depending kingpin 16 for coupling to a tractor (not shown) in the conventional manner, and has a longitudinal horizontally aligned upper deck portion 20.

A drop frame section 14 is mounted to the rear of the front section 12 and includes a longitudinally generally horizontal lower deck portion 22. The lower deck portion 22 is a distance below the upper deck portion 20. Section 14 also includes conventional ground engaging support wheels 18.

Both of these deck portions 20, 22 are substantially horizontally aligned. At the juncture of these sections, there is included depending support legs 24 which may be extended downwardly and engaged with the ground in order to maintain the trailer decks 20, 22 generally horizontally disposed when the trailer is not hitched to a towing vehicle.

Referring particularly to FIGS. 1 and 5, the conventional drop frame trailer is generally comprised of two longitudinal beams 26 in the load section 14, connected by a plurality of transverse beams 30. The front section 12 is constructed in the same manner with similar shorter longitudinal beams 28 connected by a plurality of transverse beams 32. Further, the conventional drop frame trailer 10 is also provided with outriggers 36, 38 on the load section 14 for supporting and locking a loaded intermodular container 74 in position (see FIG. 2). The outriggers are typically supplied with twist locks 46 at the ends. Those locks are well-known in the art and will not be described in detail herein.

Referring to FIGS. 1 and 2, the trailer construction of this invention modifies the aforedescribed conventional drop frame trailer by providing pedestal means, generally designated 40, which are removably mounted generally mid-span, on the drop frame section 14 for supporting a first intermodular container 42 substantially horizontally at its rear portion 45, when the front portion 44 of the container 42 is supported on the upper deck 20. The said intermodular container 42 is per se conventional, and may include a tank 41 which is secured within a frame 43. For purposes of the present discussion, an intermodular container 41, as well as a second container 51 (within its frame 53), can be regarded as "empties", i.e., the contents have been previously removed at a user's facility.

The pedestal means 40 further includes a means for locking the first container in position, e.g. twist lock 48, at its rear portion 45 and a front outrigger 70 mounted to upper deck 20 having a means for locking the front portion 44 of container 42. The pedestal means 40 may further include means for supporting and locking, generally 50, a second intermodular container 52 at its front portion 55, substantially horizontally when the rear portion 54 of the second container 52 is supported on the lower deck 22. A rear outrigger 72 is mounted to lower deck 22 and has a means for locking the rear portion 54 of container 52.

Referring to FIGS. 1, 3, 4, 6 and 7, the pedestal means 40 generally comprises two outrigger members 56, each projecting transversely from a side of the lower deck 22. These outrigger members 56, as shown more clearly in FIGS. 4 and 5, typically include a U-shaped beam 58 projecting transversely from each longitudinal beam 26 of the section 14. A support member 60 is pivotally mounted to the U-shaped beam 58 at the beam's outermost upper point by a pivot pin 62 which passes through the beam 58 and the bottom outer corner of member 60 and is parallel to longitudinal beams 26 of lower deck 22. The support member 60 can thus be pivoted from a vertical position, FIG. 3, to a horizontal position, FIG. 4, where it is substantially flush with the lower deck 22 formed by the longitudinal beams 26 and enclosed and protected by beam 58.

Each support member 60 is further provided with a position locking means for locking the support member in the vertical or horizontal position. This is accomplished in the embodiment depicted in FIGS. 4 and 5 by holes 64,66 provided in beam 58 and hole 69 in member 60 at the lower end of beam 58 (hole 66), the upper intermediate section of beam 58 (hole 64) which permits a removable pin 68 to be passed through the holes 64, 66 in the beam 58 and holes 69 in member 60. This position locking means may further include ledges 76 and 78 to further assist in locking and position the support member 60 in the vertical or horizontal position.

Each support member further includes a pair of container locking means 71 and 48, e.g. twist locks. The lowermost of these, i.e., at 71, serves to lock the second container 52 in the substantially horizontal position when the rear portion 54 of the second container 52 is supported and locked on the lower deck 22 to rear outrigger 72. Optionally, handles (not shown) may be mounted to the front of support member 60 to provide for raising and lowering the member. The uppermost lock 48, serves a similar function in locking the frame portion of container 42.

The pedestal means 40 to secure the two empty containers 42, 52, in order to function properly in this invention must be removed from its first position in order to carry a single centrally located filled container 74 (FIG. 2). This may be accomplished in several ways, such as a completely removable pedestal means, pedestal which can be vertically elevated, hinged pedestals, and sliding pedestals. For the sake of exemplification and clarity, only a hinged type pedestal means has been described, however, it is evident that these other types may be used in this invention.

In use, as depicted in FIG. 2, a relatively heavily loaded container 74 is locked onto outriggers 36 and 38 and transported to the desired location. During this use, the pedestal is in the folded or recessed position of FIG. 4. After unloading the container, the support member 60 is pivoted to the vertical position, (FIG. 3), locked in place, and the front of one container 42 is placed on the upper deck 20 of the front section 12 and locked in position by locks on outrigger 70. The rear portion 45 of the container 42 is locked in position on the vertically positioned support member 60. The rear of a second unloaded container 52 is then locked onto the rear outrigger 72 and the front 55 is then locked in position by lock 71 onto the support member 60.

Thus, it can be seen that the present trailer, although it can carry one heavily loaded container safely due to the low center of gravity, can return two unloaded containers in a safe, stable and locked position while traveling the road. Another advantage of this invention is that it consists of various components which are commercially available structural members such as channels, I-beams, twist locks, angle frames and plates, which can be used to modify the conventional "drop frame trailer" to produce this invention.

In FIG. 8 a further side elevational view is set forth of a further embodiment of a trailer construction in accordance with the present invention. This showing is generally similar to FIG. 1 in purpose. It is to be noted, however, that the embodiment set forth in FIG. 8 differs in two important particulars from the device shown in FIG. 1. In particular, it will be seen that the pedestal means 14 has now been modified so that the container locking means 71a and 41a, instead of being stepped in height with respect to one another, as in FIGS. 1 and 3, are now at the same height. Additionally, it is seen that a rearward elevated bolster 90 is provided, which also includes a container locking means 91, i.e. a twist lock. It is seen that the elevation of bolster 90 is such that its height is the same as that of upper deck portion 20. Thus it is seen in FIG. 8 that with the pedestal in its extended position, the two intermodular containers 42 and 52 can accordingly be supported at the same height on the trailer 10.

The particular further advantage of the embodiment shown in FIG. 8 appears from reference to FIG. 9. In this instance the pedestal is in its folded or recessed position, similar to the discussion had in connection with FIG. 2. By virtue of the elevated rear bolster 72 it will now be evident, however, that an extended, e.g. 40 foot, container can now be supported on the trailer of FIGS. 8 and 9 by being specifically supported between the front elevated deck 20 and the rear bolster 90. This feature, therefore, enables a yet further flexibility in a construction in accordance with the present invention.

While it is apparent that the invention herein disclosed is well calculated to achieve the benefits and advantages as here and above set forth, it can be appreciated that the invention is susceptible to modification, variation, and change without departing from the spirit thereof.

What is claimed is:

1. A trailer construction for transporting a pair of intermodular containers, comprising:
   (a) a front section having a hitch means for attaching the trailer to a towing vehicle, and a longitudinal generally horizontally aligned upper deck portion;
   (b) a drop frame section extending rearwardly of the front section, said drop frame section including ground engageable support wheels and having a longitudinal generally horizontal lower deck portion, wherein the lower deck is a distance below the said upper deck;
   (c) pedestal means mounted on said drop frame section, said means being movable between first and second positions, said pedestal means in said first position including first support means above said lower deck portion for supporting the rear end of a first said container to maintain said container substantially horizontal when the front end of the container is supported on said upper deck, and in said second position being substantially flush with said lower deck portion, permitting carrying of a single container which is entirely positioned upon said lower deck portion; and
   (d) the lower deck portion extending rearwardly of said pedestal means, being of at least sufficient length to carry a second container thereupon, the front end of which is supported at said pedestal means.

2. A trailer in accordance with claim 1, wherein said pedestal means further includes second support means for supporting the front end of said second container.

3. A trailer in accordance with claim 1, wherein the pedestal means and upper deck further include means for locking the said first and second containers in position.

4. A trailer in accordance with claim 1, wherein the pedestal means comprises two outrigger members projecting transversely from each side of the lower deck and a support member pivotally mounted to each outrigger member, wherein the support member can be pivoted from a vertical position to a horizontal position substantially flush with the lower deck.

5. A trailer in accordance with claim 4, further comprising position-locking means for locking the support member in the vertical or horizontal position.

6. A trailer in accordance with claim 5, wherein the support member and lower deck further include container-locking means for locking said second container substantially horizontally when the rear portion of said second container is supported on the lower deck.

7. A trailer in accordance with of claims 5 or 6, wherein the container-locking means are twist locks.

8. A trailer construction for transporting a pair of intermodular containers, comprising:
   (a) a front section having a hitch means for attaching the trailer to a towing vehicle, and a longitudinal generally horizontally aligned upper deck portion;
   (b) a drop frame section extending rearwardly of the front section, said drop frame section having a generally horizontal lower deck portion, wherein the lower deck is a distance below the said upper deck;
   (c) pedestal means mounted on said drop frame section, said pedestal means being movable between a first position for supporting the rear end of a first said container to maintain said container substantially horizontal when the front end of the container is supported on said upper deck, and a second position substantially flush with said lower deck portion, permitting carrying of a container which is centrally positioned upon said lower deck portion; and
   (d) the lower deck portion extending rearwardly of said pedestal means, being of at least sufficient length to carry a second container thereupon, the front end of which is supported at said pedestal means.

9. A trailer in accordance with claim 8, wherein said pedestal means further includes support means for supporting the front end of said second container.

10. A trailer in accordance with claim 9, including an elevated rear bolster having support means at the height of said upper deck portion, whereby said second container may be carried on said trailer by being supported between said pedestal means and said rear bolster.

* * * * *